(12) United States Patent
Chi-Hsueh et al.

(10) Patent No.: US 10,899,218 B2
(45) Date of Patent: Jan. 26, 2021

(54) VEHICLE

(71) Applicants: Richard Chi-Hsueh, San Diego, CA (US); Chung-Yeh Hsu, New Taipei (TW); Tzu-Chin Hsu, New Taipei (TW); Yie-Yeh Hsu, New Taipei (TW)

(72) Inventors: Richard Chi-Hsueh, San Diego, CA (US); Chung-Yeh Hsu, New Taipei (TW); Tzu-Chin Hsu, New Taipei (TW)

(73) Assignees: Richard Chi-Hsueh, San Diego, CA (US); Chung-Yeh Hsu, New Taipei (TW); Tzu-Chin Hsu, New Taipei (TW); Yie-Yeh Hsu, New Taipei (TW)

( * ) Notice: Subject to any disclaimer, the term of this patent is extended or adjusted under 35 U.S.C. 154(b) by 169 days.

(21) Appl. No.: 16/281,309

(22) Filed: Feb. 21, 2019

(65) Prior Publication Data

US 2019/0263244 A1    Aug. 29, 2019

Related U.S. Application Data

(60) Provisional application No. 62/634,815, filed on Feb. 24, 2018, provisional application No. 62/638,113, filed on Mar. 3, 2018.

(51) Int. Cl.
*B60K 6/26* (2007.10)
*B60K 6/40* (2007.10)
(Continued)

(52) U.S. Cl.
CPC .............. *B60K 6/26* (2013.01); *B60B 27/023* (2013.01); *B60B 27/04* (2013.01); *B60K 6/24* (2013.01); *B60K 6/28* (2013.01); *B60K 6/36* (2013.01); *B60K 6/40* (2013.01); *B60K 7/0007* (2013.01); *B60W 10/08* (2013.01); (Continued)

(58) Field of Classification Search
CPC ......... B60B 27/023; B60B 27/04; B60K 6/24; B60K 6/28; B60K 6/36; B60K 6/40; B60K 7/0007; B60K 2001/0438; B60K 2007/0046; B60K 2007/0076; B60W 10/08; H02K 5/1732; H02K 7/006; H02K 7/0083; H02K 7/116; H02K 11/0094; H02K 11/22; H02K 21/24; B60Y 2200/92; B60Y 2400/60
See application file for complete search history.

(56) References Cited

U.S. PATENT DOCUMENTS 8,471,418 B2 * 6/2013 Yamasaki ............ B62D 5/0406
310/68 R
2005/0045392 A1   3/2005 Maslov et al.
(Continued)

FOREIGN PATENT DOCUMENTS

CN    201178356 Y    1/2009
CN    101110536 B    6/2011

*Primary Examiner* — Bryan A Evans
(74) *Attorney, Agent, or Firm* — Rosenberg, Klein & Lee

(57) ABSTRACT

A mobile vehicle is disclosed herein. It comprises a car body having four wheels, an engine room on a front side thereof and a luggage compartment on a rear side thereof, and at least one drive motor disposed in the engine room or the luggage compartment or both and each of which has a motor body and a rotational shaft passing through a center of the motor body for driving the four wheels to rotate through a driver assembly.

20 Claims, 12 Drawing Sheets

(51) Int. Cl.
*B60K 6/28* (2007.10)
*B60K 6/24* (2007.10)
*B60K 6/36* (2007.10)
*H02K 7/00* (2006.01)
*H02K 7/116* (2006.01)
*H02K 11/00* (2016.01)
*H02K 11/215* (2016.01)
*H02K 11/22* (2016.01)
*H02K 7/08* (2006.01)
*B60B 27/02* (2006.01)
*B60B 27/04* (2006.01)
*B60K 7/00* (2006.01)
*B60W 10/08* (2006.01)
*H02K 21/24* (2006.01)
*H02K 5/173* (2006.01)
*B60K 1/04* (2019.01)

(52) U.S. Cl.
CPC ........... *H02K 5/1732* (2013.01); *H02K 7/006* (2013.01); *H02K 7/083* (2013.01); *H02K 7/116* (2013.01); *H02K 11/0094* (2013.01); *H02K 11/215* (2016.01); *H02K 11/22* (2016.01); *H02K 21/24* (2013.01); *B60K 2001/0438* (2013.01); *B60K 2007/0046* (2013.01); *B60K 2007/0076* (2013.01); *B60Y 2200/92* (2013.01); *B60Y 2400/60* (2013.01)

(56) References Cited

U.S. PATENT DOCUMENTS

| | | |
|---|---|---|
| 2012/0302390 A1 | 11/2012 | Lemire-Elmore et al. |
| 2015/0231958 A1* | 8/2015 | Chi-Hsueh ........... B60K 17/356 180/242 |
| 2019/0263245 A1* | 8/2019 | Chi-Hsueh ......... H02K 11/0094 |
| 2019/0305638 A1* | 10/2019 | Chi-Hsueh ........... H02K 1/2793 |

* cited by examiner

VEHICLE

BACKGROUND OF THE INVENTION

1. Field of the Invention

The present invention relates to a mobile vehicle which comprises at least one drive motor disposed in a spacious engine room or luggage compartment without being limited to a narrow space of a wheel frame so that the volume of the motor body can be increased according to the use requirement to achieve the effects of providing large torque and horsepower and improving the endurance of the mobile vehicle.

2. Description of Related Art

Mobile vehicles, e.g. conventional vehicles, use gasoline as fuel. In order to solve the problems of global warming and air pollution caused by gasoline emissions, hybrid electric vehicles and electric vehicles have been developed.

The drive motors of the conventional hybrid electric vehicles and electric vehicles are generally assembled in the wheel frames of the wheels, and thus such drive motors are also referred to as hub motors or rim motors. For instance, the US patent US2005/0045392, published on 3 Mar. 2005, has disclosed in-wheel electric motors; the US patent US2012/0302390, published on 29 Nov. 2012, has disclosed a bidirectional hub motor with unidirectional two-speed output; the China patent CN201178356Y, issued on 7 Jan. 2009, has disclosed a drive motor and a speed-change device; and the China patent CN101110536B, issued on 1 Jun. 2011, has disclosed a rim motor with automatic speed changing function. The drive motors of the abovementioned patents disposed in the wheel frames mainly comprises a stator unit, a rotor unit and an axle. A silicon steel sheet of the stator unit is wound with plural coils. A rotor casing of the rotor unit defines an internal space, and the stator unit is accommodated in the internal space. Plural magnets are arranged at intervals on a lateral wall of the rotor casing to surround a periphery of the silicon steel sheet of the stator unit and connect the rotor casing to a wheel frame. The axle is inserted into the stator unit and protruded from the rotor casing to connect a car body of a mobile vehicle. Accordingly, when the coils of the stator unit are energized and interact with the plural magnets of the rotor unit, the rotor casing of the rotor unit rotates relative to the stator unit, thereby making the wheel frame of the wheel combined with the rotor casing rotate to drive the mobile vehicle to move.

However, the drive motors of the conventional hybrid electric vehicles and electric vehicles mentioned above have disadvantages as following:

1. The volume of the drive motor and the volume of the silicon steel sheet of the stator unit and the plural magnets of the rotor unit accommodated therein are limited due to the narrow space of the wheel frame, so the output horsepower and torque of the drive motor are relatively reduced.

2. When the mobile vehicle is driven on the road surface, the wheel and the drive motor assembled therein are subject to frequent vibrations, especially when the road surface is bumped, the severe vibration may cause damage to the drive motor.

3. The lateral wall of the rotor casing has limited area and space for assembling the plural magnets, so the plural magnets are small and thin, and the sensing area between the plural magnets and the silicon steel sheet is small, resulting in reduced output horsepower and torque.

SUMMARY OF THE INVENTION

In view of the above-mentioned problems, the object of the present invention is to provide a mobile vehicle which comprises at least one drive motor disposed in a spacious engine room or luggage compartment without being limited to a narrow space of a wheel frame so that the volume of the motor body can be increased according to the use requirement to achieve the effects of providing large torque and horsepower and improving the endurance of the mobile vehicle.

Disclosed herein is a mobile vehicle. It mainly comprises a car body having four wheels, an engine room on a front side thereof and a luggage compartment on a rear side thereof, and at least one drive motor disposed in the engine room or the luggage compartment or both. Each of the at least one drive motor has a motor body and a rotational shaft passing through a center of the motor body for driving the four wheels to rotate through a driver assembly.

Accordingly, the drive motor is disposed in the spacious engine room or luggage compartment without being limited to a narrow space of a wheel frame. Furthermore, the volume of the motor body, the stator unit and the rotor unit of the drive motor can be increased according to the use requirement, and the volume of the stator ring of the stator unit and the permanent magnetic sheets of the rotor unit can also be increased to promote the magnetic field effects of the stator ring and the permanent magnetic sheets so as to achieve the effects of providing large torque and horsepower and improving the endurance of the mobile vehicle.

DETAILED DESCRIPTION OF THE PREFERRED EMBODIMENT

Figure 1:
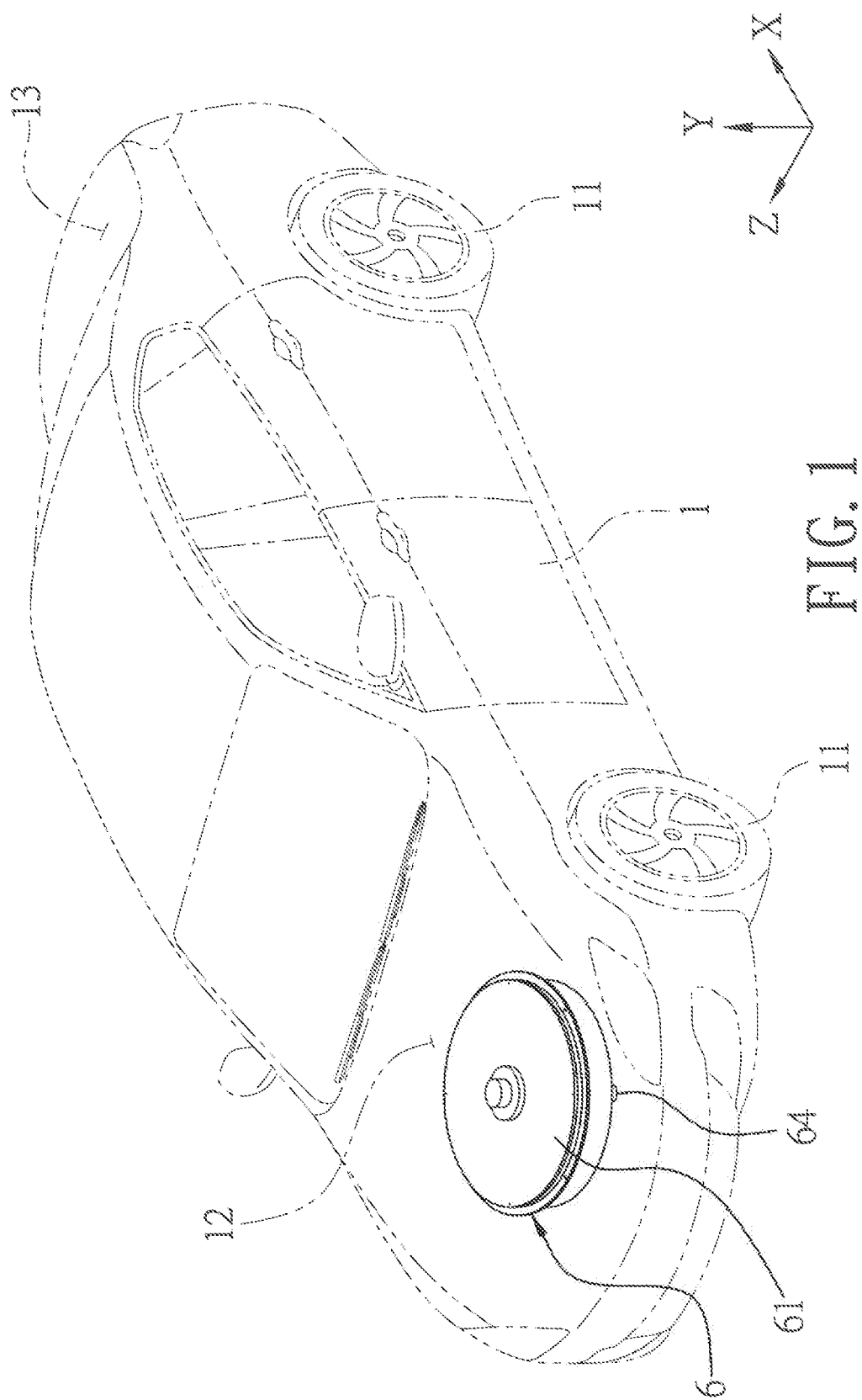
FIG. 1 is a stereogram showing a first embodiment for a mobile vehicle according to the present invention.
Figure 2:
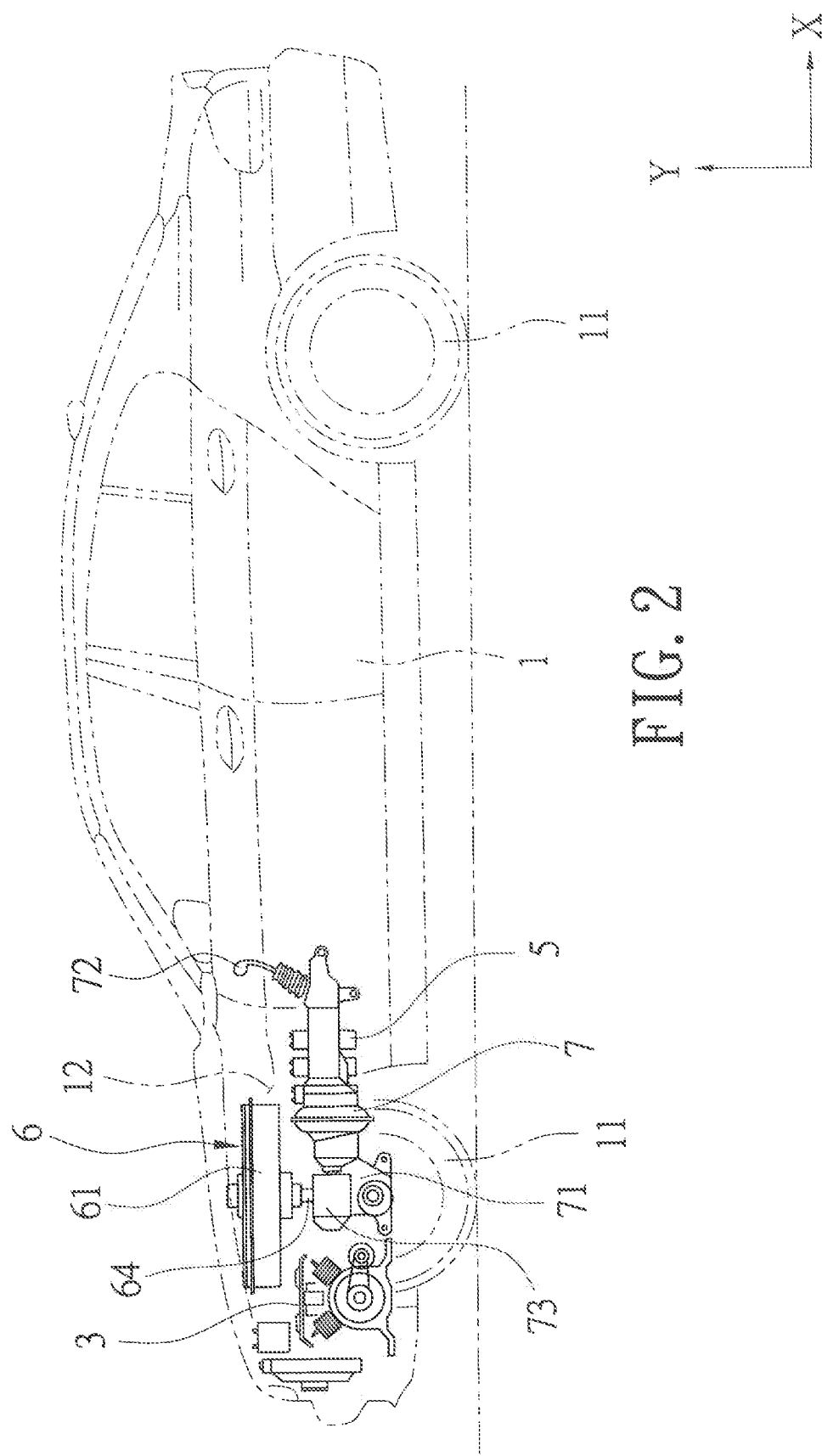
FIG. 2 is a side view showing a mobile vehicle according to the present invention.
Figure 3:
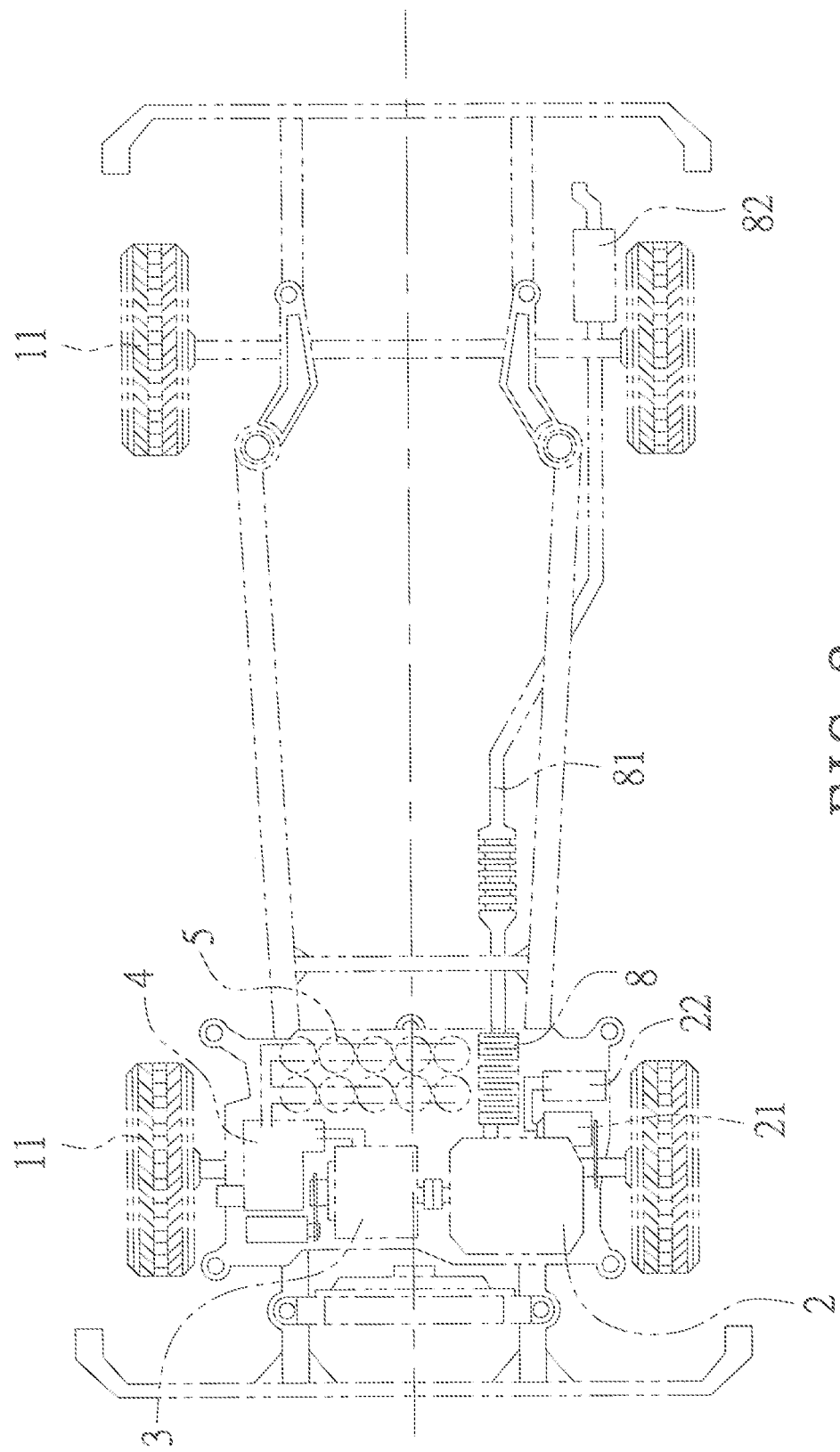
FIG. 3 is a top view showing a mobile vehicle according to the present invention.
Figure 4:
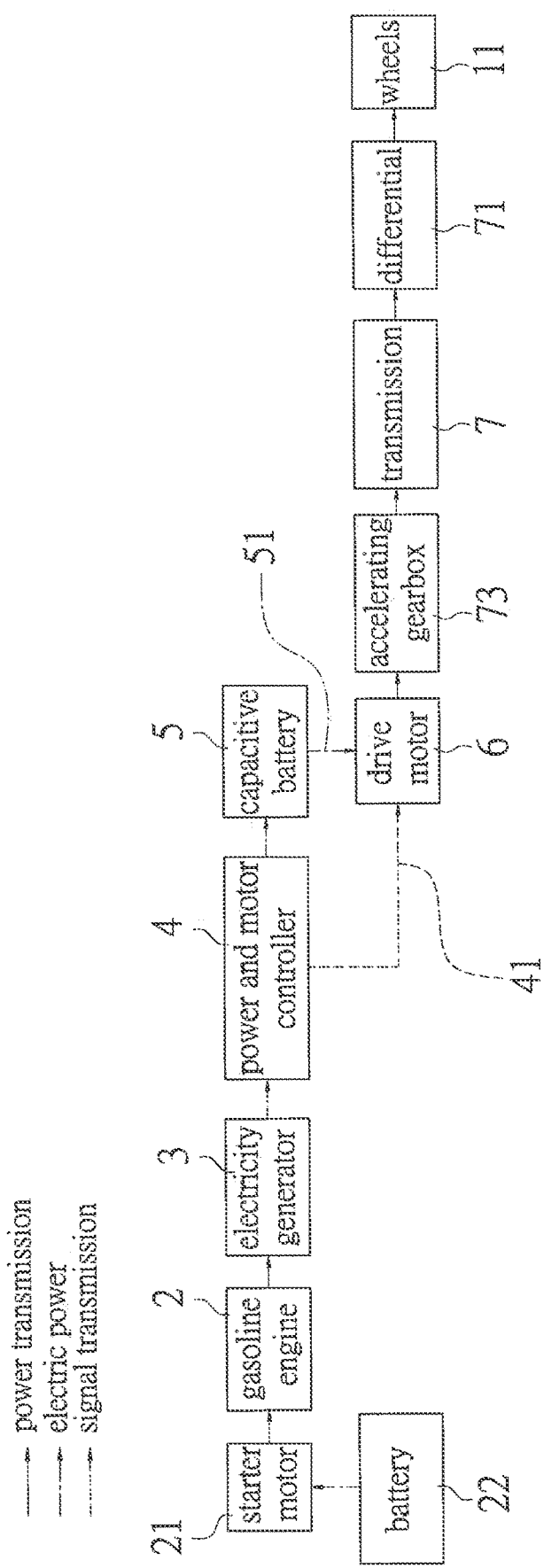
FIG. 4 is a control flow chart showing a mobile vehicle according to the present invention.

Hereinafter, an exemplary embodiment of the present invention will be described in detail with reference to the accompanying drawings.

First, referring to FIG. 1 to FIG. 4, a mobile vehicle according to the present invention comprises is disclosed. The mobile vehicle comprises:

a car body (1) having two wheels (11) on two laterals of each of a front side and a rear side thereof, an engine room (12) on the front side thereof, and a luggage compartment (13) on the rear side thereof;

a gasoline engine (2) in the car body (1) and having a starter motor (21) and a battery (22) connected to the starter motor (21) for supplying DC12V power; preferably, the gasoline engine (2) is a small ultra-high speed gasoline engine;

an electricity generator (3) with high efficiency connected to the gasoline engine (2) in the car body (1);

a power and motor controller (4) connected to the electricity generator (3) in the car body (1) and having at least one signal cable (41);

at least one capacitive battery (5) connected to the power and motor controller (4) in the car body (1) for storing large capacity power and fast charging and discharging and having at least one power cable (51); and a drive motor (6) disposed in the engine room (12) or the luggage compartment (13) and connected to the at least one capacitive battery (5) by the at least one power cable (51) and to the power and motor controller (4) by the at least one signal cable (41).

The gasoline engine (2) is about one quarter of the volume of a gasoline engine of a similar vehicle and with a rotating speed of about 4,000 rpm to 14,000 rpm, which mainly drives the electricity generator (3) to generate high voltage and large current of DC380V~DC480V. The power and motor controller (4) adjusts, rectifies, and stabilizes the high-voltage, high-current electric energy generated by the electricity generator (3) to the state that is suitable for the at least one capacitive battery (5) to store, and the power and motor controller (4) controls the start, running speed, and stop of the drive motor (6).

Figure 7:
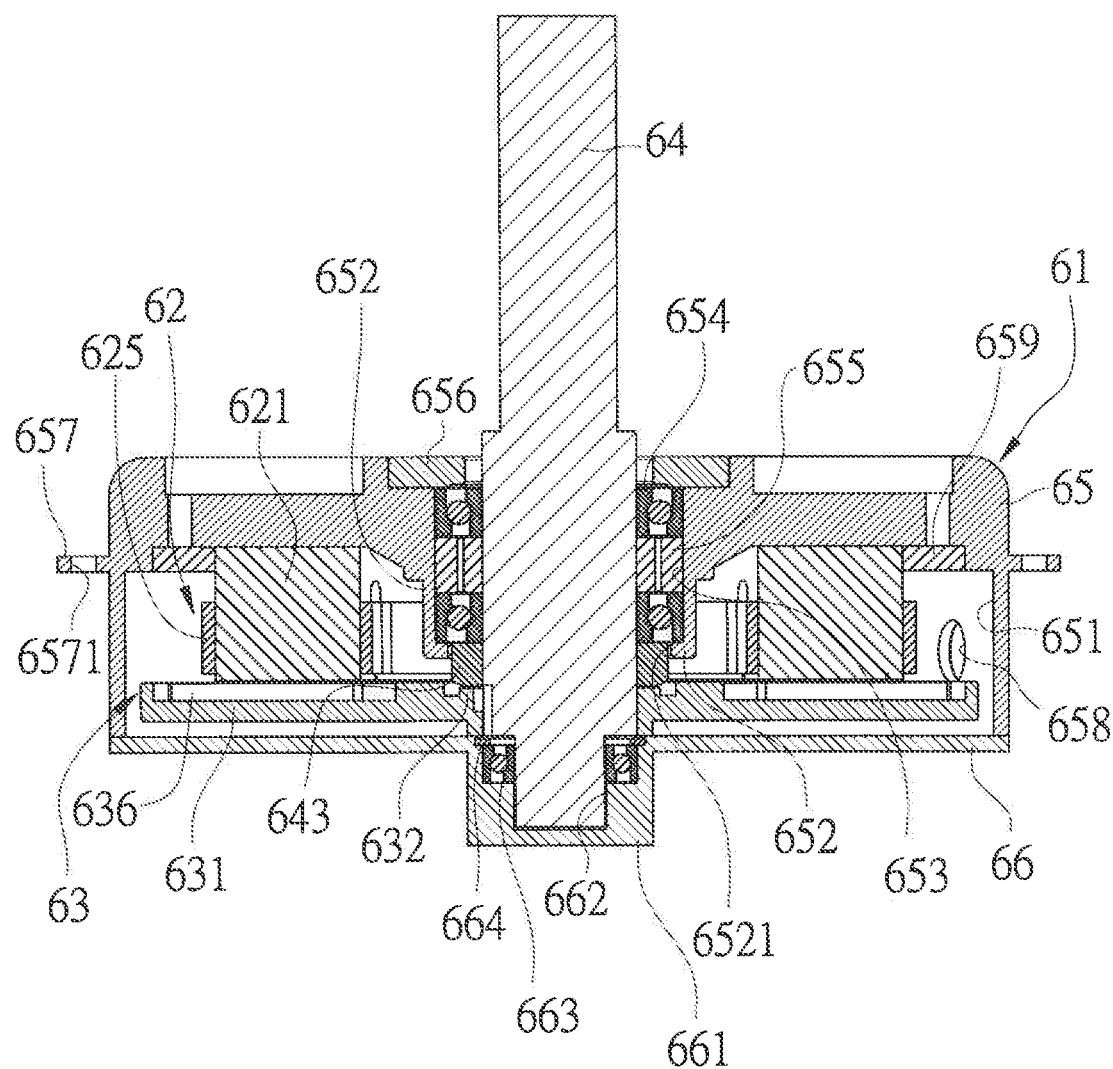
FIG. 7 is a cross-sectional view showing the first embodiment for the drive motor in assembly according to the present invention.

Referring to FIG. 7, the drive motor (6) has a motor body (61) disposed along an X-axis in the engine room (12) or the luggage compartment (13), a stator unit (62) on one side of the motor body (61), a rotor unit (63) on the other side of the motor body (61) and a rotational shaft (64) passing through a center of the motor body (61) along a Y-axis for assembling to the rotor unit (63) for fixation. A volume of the motor body (61), the stator unit (62) and the rotor unit (63) can be simultaneously amplified toward one or more of the X-axis, the Y-axis, and a Z-axis. The X-axis is the horizontal direction with respect to the front and rear portions of the car body (1) of the mobile vehicle; the Y-axis is the vertical direction with respect to the upper and lower portions of the car body (1) of the mobile vehicle; and the Z-axis is the direction parallel to the axial direction of the front wheels (11) or the rear wheels (11) of the car body (1). The mobile vehicle further comprises a transmission (7) disposed in the car body (1) and having a differential (71), a shift lever (72) and an accelerating gearbox (73) assembled to the car body (1). One end of the rotational shaft (64) is protruded from the motor body (61) to connect the accelerating gearbox (73) of the car body (1), and the accelerating gearbox (73) is connected to the transmission (7) in the car body (1). Preferably, the transmission (7) is an automatic transmission or a manual transmission. The invention adopts an automatic transmission in the embodiment. The differential (71) is disposed on the front side or the rear side of the car body (1) for connecting the transmission (7) and connected to the two wheels (11) on the two laterals of each of the front side and the rear side of the car body (1).

The car body (1) is provided with a driving room, and the shift lever (72) is disposed in the driving room and connected to the transmission (7) to control the gear position of the transmission (7). An engine exhaust purification device (8) is assembled on the car body (1). One end of the engine exhaust purification device (8) is connected to the gasoline engine (2), and the other end of the engine exhaust purification device (8) is connected to one end of an exhaust pipe (81). The other end of the exhaust pipe (81) is connected to an exhaust muffler (82). At least one heat sink is assembled on the sites of the gasoline engine (2), the electricity generator (3), and the drive motor (6) in the car body (1) to dissipate the heat generated by the gasoline engine (2), the electricity generator (3), and the drive motor (6).

Figure 5:
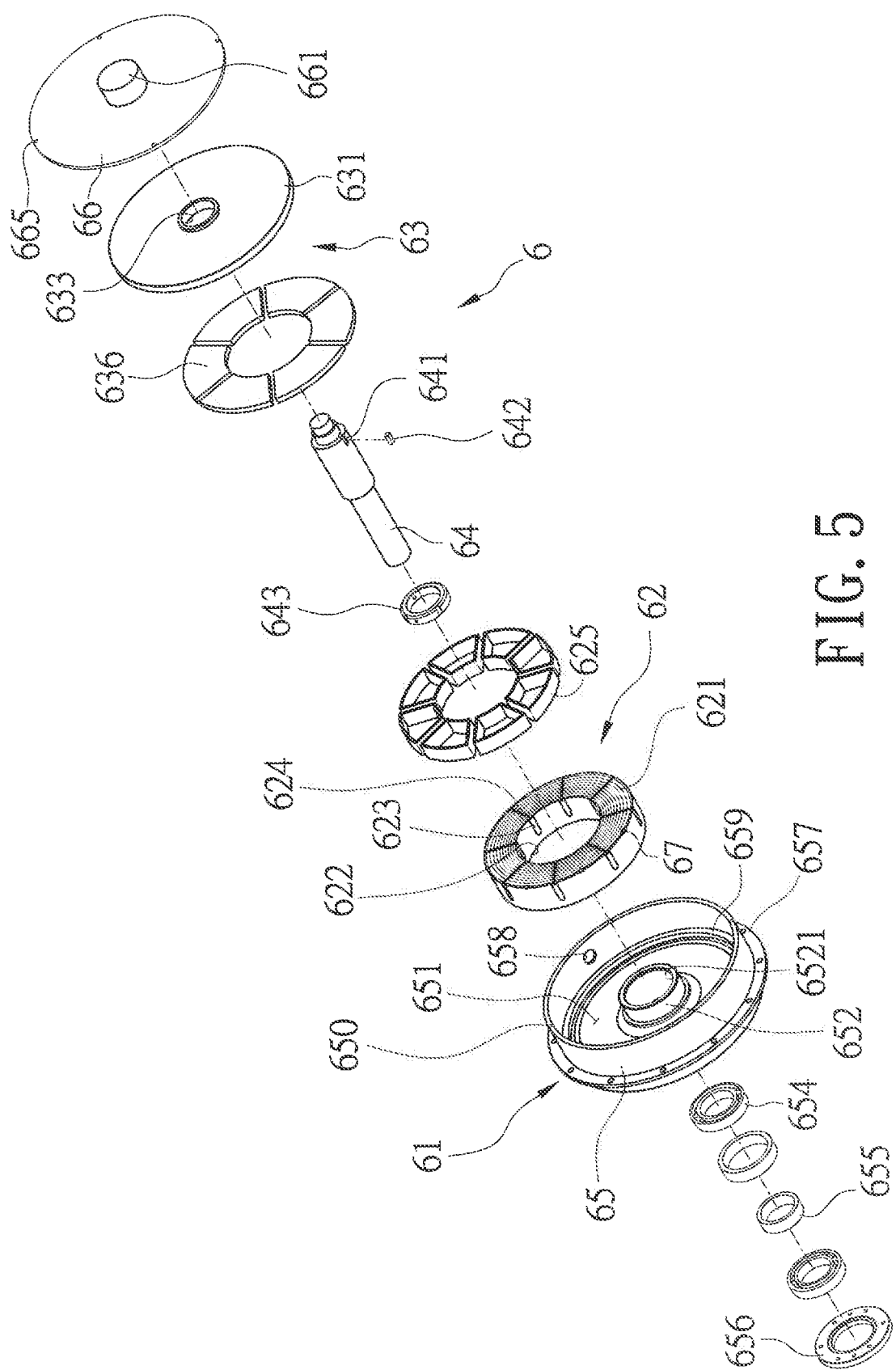
FIG. 5 is a first stereogram showing a first embodiment for a drive motor according to the present invention.
Figure 6:
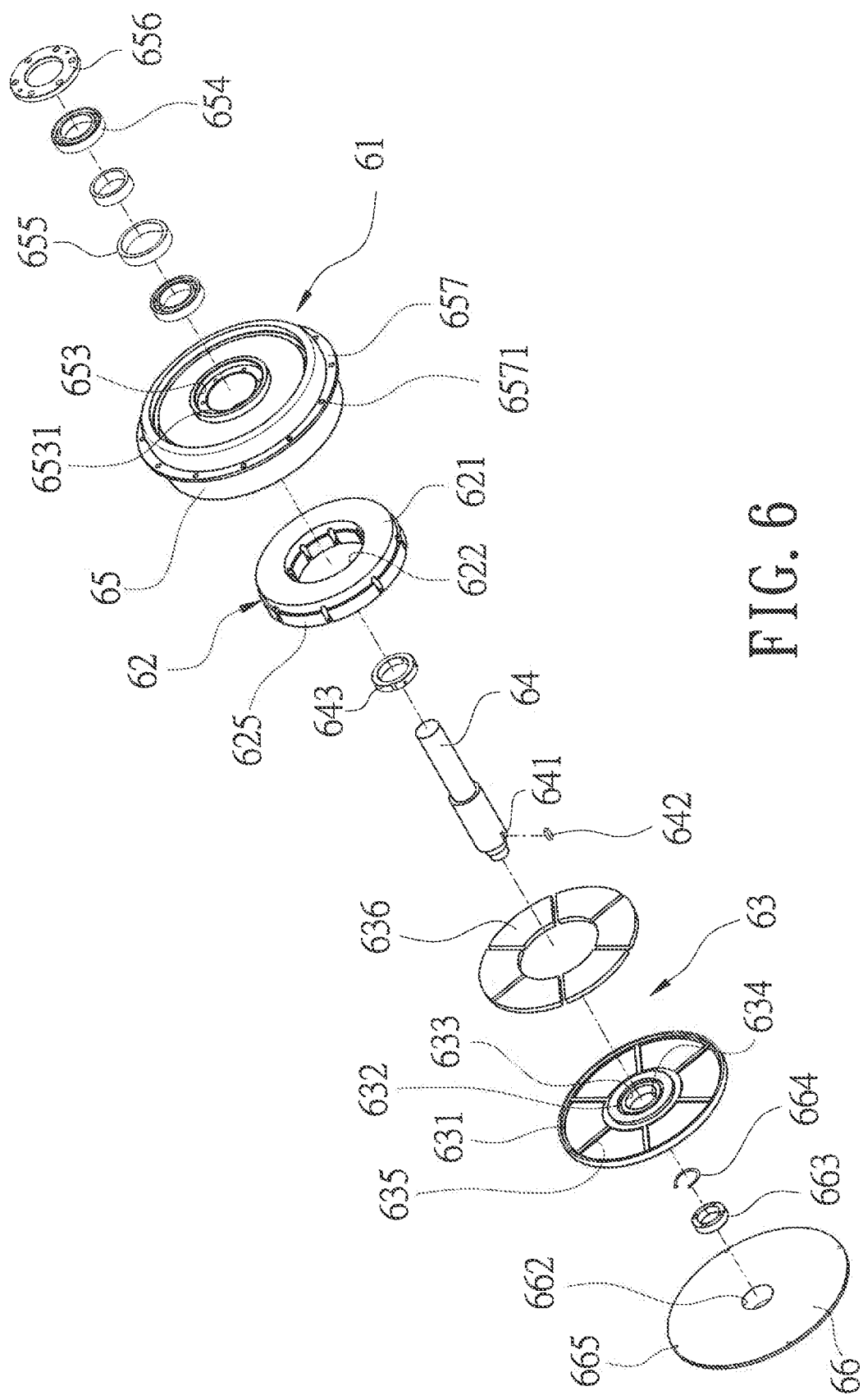
FIG. 6 is a second stereogram showing the first embodiment for the drive motor according to the present invention.

Referring to FIG. 5 to FIG. 7, a first embodiment for a drive motor according to the present invention is revealed. The motor body (61) of the drive motor (6) is constituted by a casing base (65) and a shell cover (66).

The casing base (65) comprises a chamber (651) at a first end thereof, a first assembling part (652) at a bottom center of the chamber (651) and having a shaft hole (6521) at a center thereof, a first assembling slot (653) corresponding to the first assembling part (652) at a second end thereof and having a stop flange (6531) at an opening thereof, at least one bearing (654) accommodated in the first assembling slot (653), at least one locating ring (655) accommodated in the first assembling slot (653), a retaining ring (656) in the first assembling slot (653) for screwing to the stop flange (6531) by plural fasteners and sealing the opening of the first assembling slot (653) to position the at least one bearing (654) and the at least one locating ring (655) in the first assembling slot (653), a fixing flange (657) formed on an outer wall thereof and having plural lock holes (6571) for the plural fasteners to be inserted and fixed to the car body (1), a cable outlet hole (658) on a lateral wall of the chamber (651), and a fixing ring (659) at a bottom of the chamber (651).

The stator unit (62) further comprises a stator ring (621) accommodated in the chamber (651) and having a first end and a second end fixed to the fixing ring (659), a through hole (622) at a center of the stator ring (621), plural coil holes (623) arranged at intervals on an inner wall of the stator ring (621), plural ditches (624) at the first end of the stator ring (621) for correspondingly communicating with the plural coil holes (623), and plural coils (625) for respectively winding between the two adjacent coil holes (623) and connected in series by the two adjacent coils (625) thereof for passing through the cable outlet hole (658) to connect the at least one power cable (51) of the at least one capacitive battery (5) and connect the at least one signal cable (41) of the power and motor controller (4). The stator ring (621) is made of a long steel strip that is wound and tightly fixed into a ring body, so that the stator ring (621) has high structural strength after molding.

The rotor unit (63) further comprises a rotor base (631) accommodated in the chamber (651) of the casing base (65) and having a first end and a second end corresponding to the stator ring (621), a shaft sleeve (632) at a center of the rotor base (631), a shaft hole (633) at a center of the shaft sleeve (632), a first positioning part (634) on a wall of the shaft hole (633), plural fixing slots (635) around the shaft sleeve (632)

at the second end of the rotor base (631), and plural permanent magnetic sheets (636) respectively and correspondingly corrected to the plural fixing slots (635) for farther corresponding to the plural (625) on the stator ring (621).

The rotational shaft (64) is inserted into the shaft hole (633) on the rotor base (631) and further comprises a first end, a second end, a second positioning part (641) corresponding to the first positioning part (634), a fixing element (642) for engaging the second positioning part (641) with the first positioning part (634) and fixing the rotational shaft (64) to the rotor base (631), and a positioning ring (643) for contacting the at least one bearing (654) in the first assembling slot (653) through the shaft hole (6521) of the first assembling part (652) of the casing base (65) for positioning. The second end of the rotational shaft (64) is protruded from the second end of the rotor base (631) for further passing through the through hole (622) on the stator ring (621), the shaft hole (6521) of the first assembling part (652), the at least one bearing (654) and the retaining ring (656) and finally protruding from the second end of the casing base (65).

The shell cover (66) further comprises a second assembling part (661) at a center at a first end thereof, a second assembling slot (662) at a second end thereof and corresponding to the second assembling part (661), a bearing (663) disposed in the second assembling slot (662), and a buckle ring (664) disposed at an opening of the second assembling slot (662) to position the bearing (663) in the second assembling slot (662). The shell cover (66) is correspondingly covered on an opening of the chamber (651) of the casing base (65). Furthermore, the first end of the rotational shaft (64) is protruded from the first end of the rotor base (631) to pass through the buckle ring (664) in the second assembling slot (662) for connecting the bearing (663) in the second assembling slot (662). Plural lock holes (665) are disposed on a periphery of the shell cover (66) for corresponding to plural lock holes (650) at the first end of the casing base (65). The plural fasteners are inserted into the plural lock holes (665) (650) of the shell cover (66) and the casing base (65) for locking the shell cover (66) to the casing base (65).

Accordingly, when the embodiment above is implemented, the starter motor (21) drives the mall ultra-high speed gasoline engine (2). Then, the gasoline engine (2) drives the connected high-efficiency electricity generator (3) to generate electric energy with high voltage and large current of DC380V~DC480V. After the power and motor controller (4) regulates and rectifies the generated electric energy by the electricity generator (3) to a proper state, the electric energy is then transferred to and stored in the capacitive battery (5). The capacitive battery (5) transfers the stored electric energy to the coils (625) on the stator rings (621) of the drive motor (6) through the power cable (51) to make the coils (625) on the stator rings (621) to be conductive. Hence, a rotating magnetic field is generated between the permanent magnetic sheets (636) to rotate the rotor base (631). At this time, the rotational shaft (64) is rotated with the rotor base (631). The rotational shaft (64) of the drive motor (6) drives the accelerating gearbox (73) to increase the output rotating speed of the drive motor (6) by about 2 to 6 times or more via the accelerating gearbox (73). After the transmission (7) converts the required torque and horsepower, the wheels (11) on two sides are then driven by the differential (71) to drive the mobile vehicle of the invention to move. The shift lever (72) set in the driving room can control the gear position of the transmission (7) in response to various driving conditions. When the gasoline engine (2) is actuated, the exhaust gas from the gasoline engine (2) will pass through the engine exhaust purification device (8), and then the exhaust pipe (81) discharges the exhaust gas from the exhaust muffler (82) at the rear end of the car body (1), so that low pollution, low noise and other environmental needs can be achieved.

Additionally, the drive motor (6) is disposed in the spacious engine room (12) or luggage compartment (13) without being limited to a narrow space of a wheel frame. Furthermore, the volume of the motor body (61), the stator unit (62) and the rotor unit (63) of the drive motor (6) can be selectively increased toward one or more of the X-axis, the Y-axis, and the Z-axis according to the use requirement. The diameter and the volume of the stator ring (621) of the stator unit (62) and the volume or the number of the permanent magnetic sheets (636) of the rotor unit (63) can also be increased to promote the magnetic field effects of the stator ring (621) and the permanent magnetic sheets (636), so as to achieve the effects of providing large torque and horsepower and improving the endurance of the drive motor (6).

The drive motor (6) of the invention is disposed in the engine room (12) or the luggage compartment (13) of the car body (1) to be away from the wheels (11), so the vibration damage of the drive motor (6) can be effectively reduced when the mobile vehicle travels on bumpy roads. The permanent magnetic sheets (636) of the rotor unit (63) of the drive motor (6) is disposed at an end surface of the rotor base (631) for corresponding to an end surface of the stator ring (621) of the stator unit (62), so the sensing area between the stator ring (621) and the permanent magnetic sheets (636) is increased to further promote the output horsepower and torque of the drive motor (6). Due to an increase of the volume of the stator ring (621) of the stator unit (62) and increases of the volume and the thickness of the permanent magnetic sheets (636) of the rotor unit (63) to promote the magnetic field effects and the sensing area, the same electric voltage and current can be used to obtain several times of torque and horsepower. Therefore, the horsepower needed when starting and driving as well as the torque needed when climbing can be easily achieved to effectively save the energy, and the endurance of the mobile vehicle can be improved.

The drive motor (6) is further provided with at least one of motor commutation control element (67) for connecting the power and motor controller (4) by the at least one signal cable (41). The at least one motor commutation control element (67) is a Hall element and engaged with a periphery of the stator ring (621) for detecting the change of the magnetic field strength of the rotor base (631) when rotating. Then the detected signal is transferred to the power and motor controller (4) to adjust the voltage of the coils (625) on the stator ring (621). The at least one motor commutation control element (67) can also be a magnetic commutation encoder or an optical commutation encoder and assembled to the second end of the rotational shaft (64) protrude from the casing base (65) for surrounding a periphery of the rotational shaft (64) and detecting the rotating speed of the rotational shaft (64). Then the detected signal is transferred to the power and motor controller (4) to adjust the voltage of the coils (625) on the stator ring (621). In this way, the drive motor (6) can be operated more smoothly and efficiently.

Figure 8:
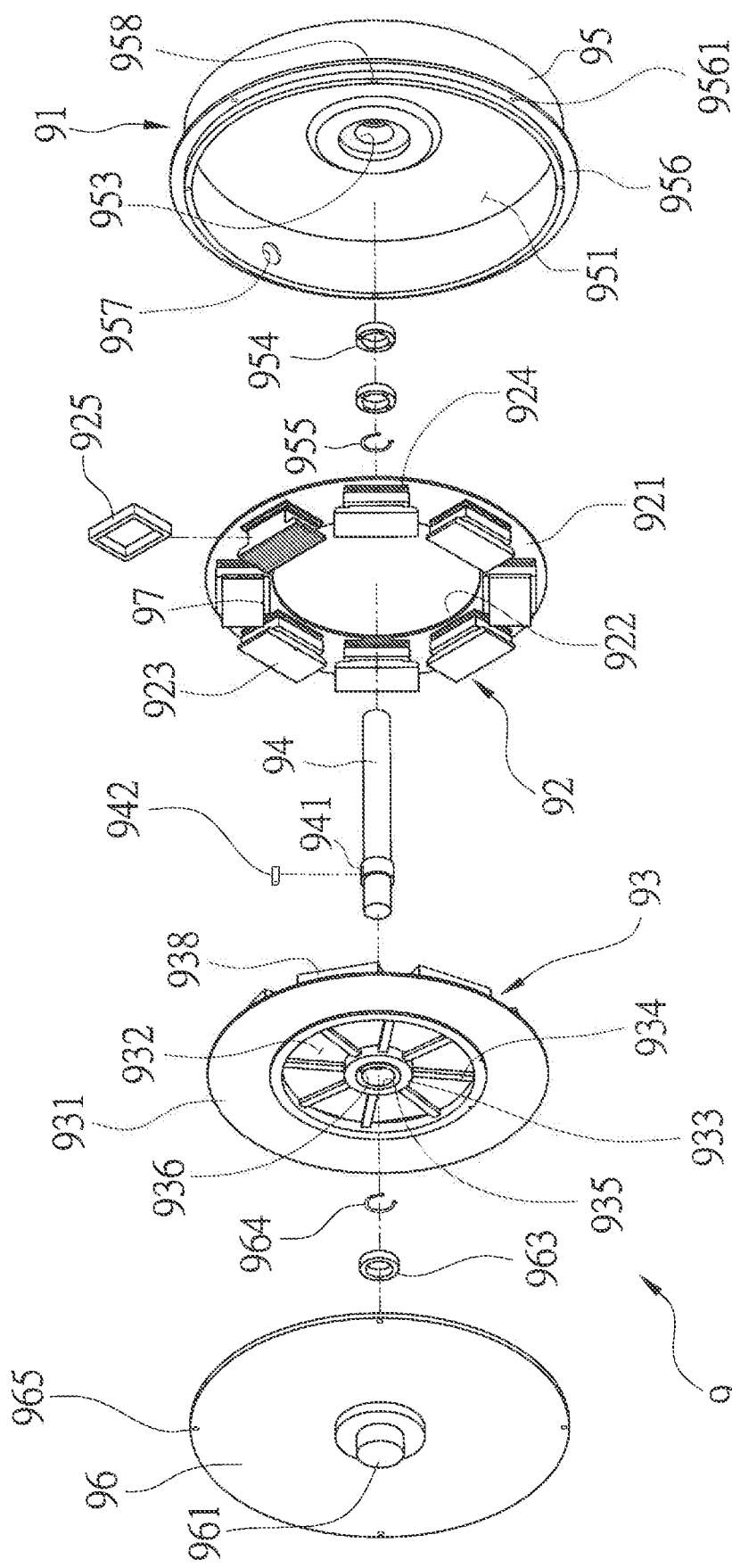
FIG. 8 is a first stereogram showing a second embodiment for a 1a drive motor according to the present invention.
Figure 9:
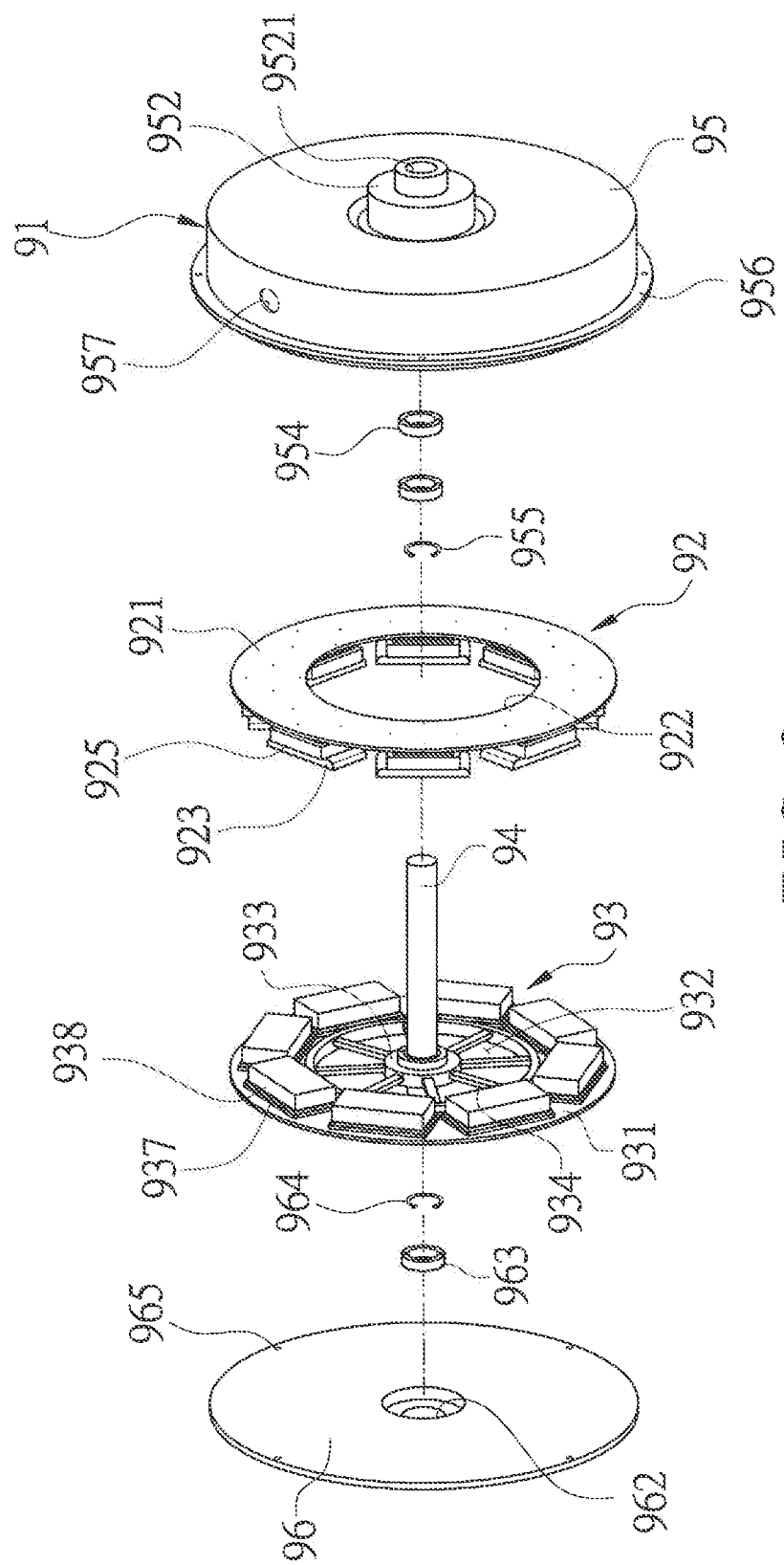
FIG. 9 is a second stereogram showing the second embodiment for the drive motor according to the present invention.
Figure 10:
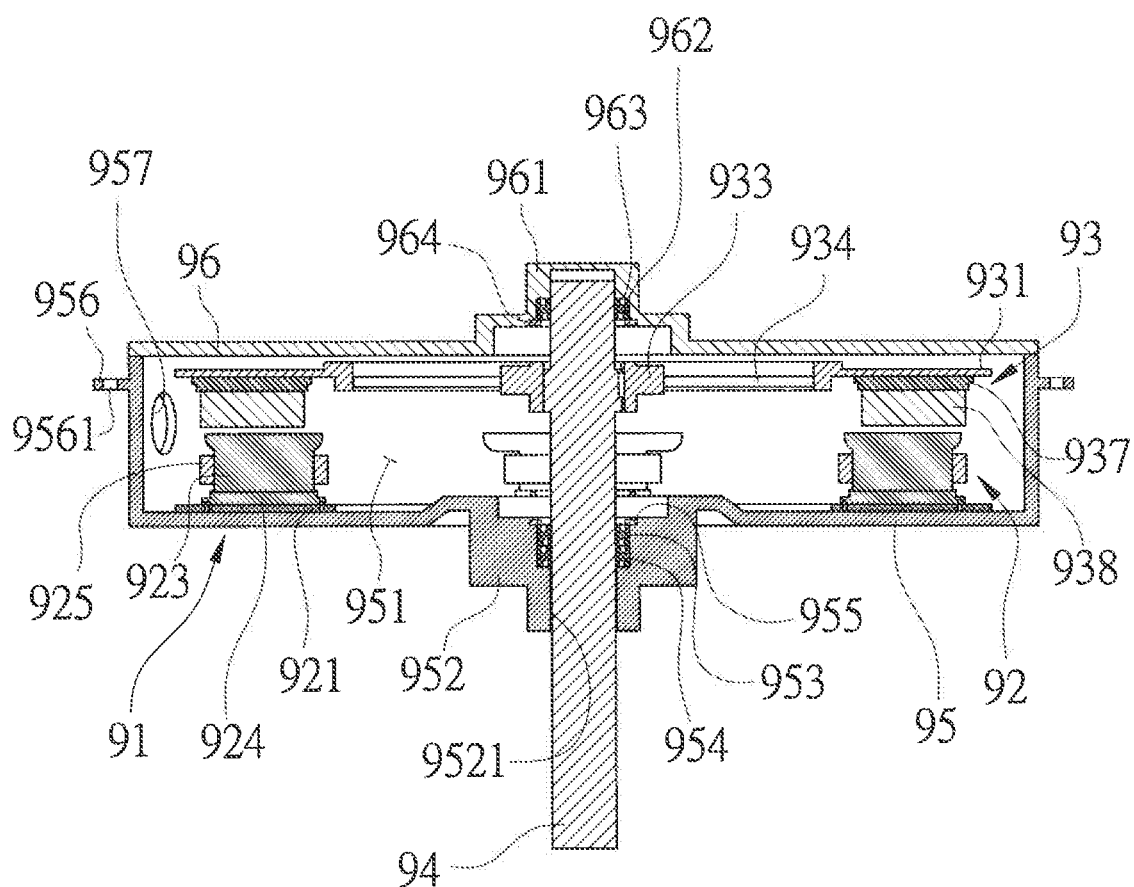
FIG. 10 is a cross-sectional view showing the second embodiment for the drive motor in assembly according to the present invention.

Referring to FIG. 8 to FIG. 10, a second embodiment for a drive motor (9) according to the present invention is revealed. The drive motor (9) mainly comprises a motor body (91), a stator unit (92), a rotor unit (93), a rotational shaft (94), a casing base (95) and a shell cover (96).

The casing base (95) further comprises a chamber (951) at a first end thereof, a first assembling part (952) at a center at a second end thereof and having a shaft hole (9521) at a center thereof, a first assembling slot (953) at a bottom of the chamber (951) and corresponding to the first assembling part (952), at least one bearing (954) accommodated in the first assembling slot (953), a buckle ring (955) disposed at an opening of the first assembling slot (953) to position the at least one bearing (954) in the first assembling slot (953), a fixing flange (956) formed on an outer wall thereof and having plural lock holes (9561) for plural fasteners to be inserted and fixed to the car body (1), and a cable outlet hole (957) on a lateral wall of the chamber (951).

The stator unit (92) further comprises a stator base (921) accommodated in the chamber (951) for the plural fasteners to be inserted and fixed to the casing base (95) and having a first end and a second end connected at a bottom of the chamber (951), a through hole (922) at a center of the stator base (921), plural stator blocks (923), plural fixed stands (924) arranged at intervals around the through hole (922) and at the first end of the stator base (921) for correspondingly connecting the plural stator blocks (923), and plural coils (925) for respectively winding the plural stator blocks (923). Each of the plural stator blocks (923) is formed by stacking plural silicon steel sheets having corresponding shapes and tightly integrated into one. The plural coils (925) are connected in series by the two adjacent coils (925) thereof for passing through the cable outlet hole (957) to connect the at least one power cable (51) of the at least one capacitive battery (5) and connect the at least one signal cable (41) of the power and motor controller (4).

The rotor unit (93) further comprises a rotor base (931), a via hole (932) at a center of the rotor base (931), a shaft sleeve (933) at a center of the via hole (932), plural ribs (934) arranged at intervals in the via hole (932) for connecting the shaft sleeve (933) so as to reduce the weight of the rotor base (931) and make it rotate smoothly, a shaft hole (935) at a center of the shaft sleeve (933), a first positioning part (936) on a wall of the shaft hole (935), plural fixed bases (937) around the shaft sleeve (933) at the second end of the rotor base (931), and plural permanent magnetic sheets (938) respectively connected to the plural fixed bases (937) for further corresponding to the plural stator blocks (923) on the stator base (921). The rotor base (931) is accommodated in the chamber (951) of the casing base (95) and has a first end and a second end, and the second end of the rotor base (931) faces the stator unit (92).

The rotational shaft (94) is inserted into the shaft hole (935) on the rotor base (931) and further comprises a first end, a second end, a second positioning part (941) corresponding to the first positioning part (936), a fixing element (942) for engaging the second positioning, part (941) with the first positioning part (936) and fixing the rotational shaft (94) to the rotor base (931). The second end of the rotational shaft (94) is protruded from the second end of the rotor base (931) for further passing through the through hole (922) on the stator base (921), the shaft hole (9521) of the first assembling part (952), the at least one bearing (954) and the buckle ring (955) and finally protruding from the second end of the casing base (95).

The shell cover (96) further comprises a second assembling part (961) at a center at a first end thereof, a second assembling slot (962) at a second end thereof and corresponding to the second assembling part (961), a bearing (963) disposed in the second assembling slot (962), and a buckle ring (964) disposed at an opening of the second assembling slot (962) to position the bearing (963) in the second assembling slot (962). The shell cover (96) is correspondingly covered on an opening of the chamber (951) of the casing base (95). The first end of the rotational shaft (94) is protruded from the first end of the rotor base (931) to pass through the buckle ring (964) in the second assembling slot (962) for connecting the bearing (963) in the second assembling slot (962). Plural lock holes (965) are disposed on a periphery of the shell cover (96) for corresponding to plural lock holes (958) at the first end of the casing base (95). The plural fasteners are inserted into the plural lock holes (965) (958) of the shell cover (96) and the casing base (95) for locking the shell cover (96) to the casing base (95).

Accordingly, the capacitive battery (5) delivers electric energy to the plural coils (925) wound on the plural stator blocks (923) of the drive motor (9) by the power cable (51), and the plural coils (925) generate a rotating magnetic field between the plural permanent magnetic sheets (938) on the rotor base (931) to drive the rotor base (931) to rotate. At the same time, the rotational shaft (94) fixedly coupled to the rotor base (931) is also rotated to drive the transmission (7) coupled to the rotational shaft (94) for torque and horsepower conversion. After the transmission (7) converts the required torque and horsepower, the wheels (11) on two sides are then driven by the differential (71) to drive the mobile vehicle of the invention to move.

Furthermore, a motor commutation control element (97) is embedded at an edge of at least one of the plural stator blocks (923) of the drive motor (9). The motor commutation control element (97) is a hall element for detecting the change of the magnetic field strength of the rotor base (931) when rotating. Then the detected signal is transferred to the power and motor controller (4) to adjust the voltage of the coils (925) on the plural stator blocks (923). In this way, the drive motor (9) can be operated more smoothly and efficiently.

Figure 11:
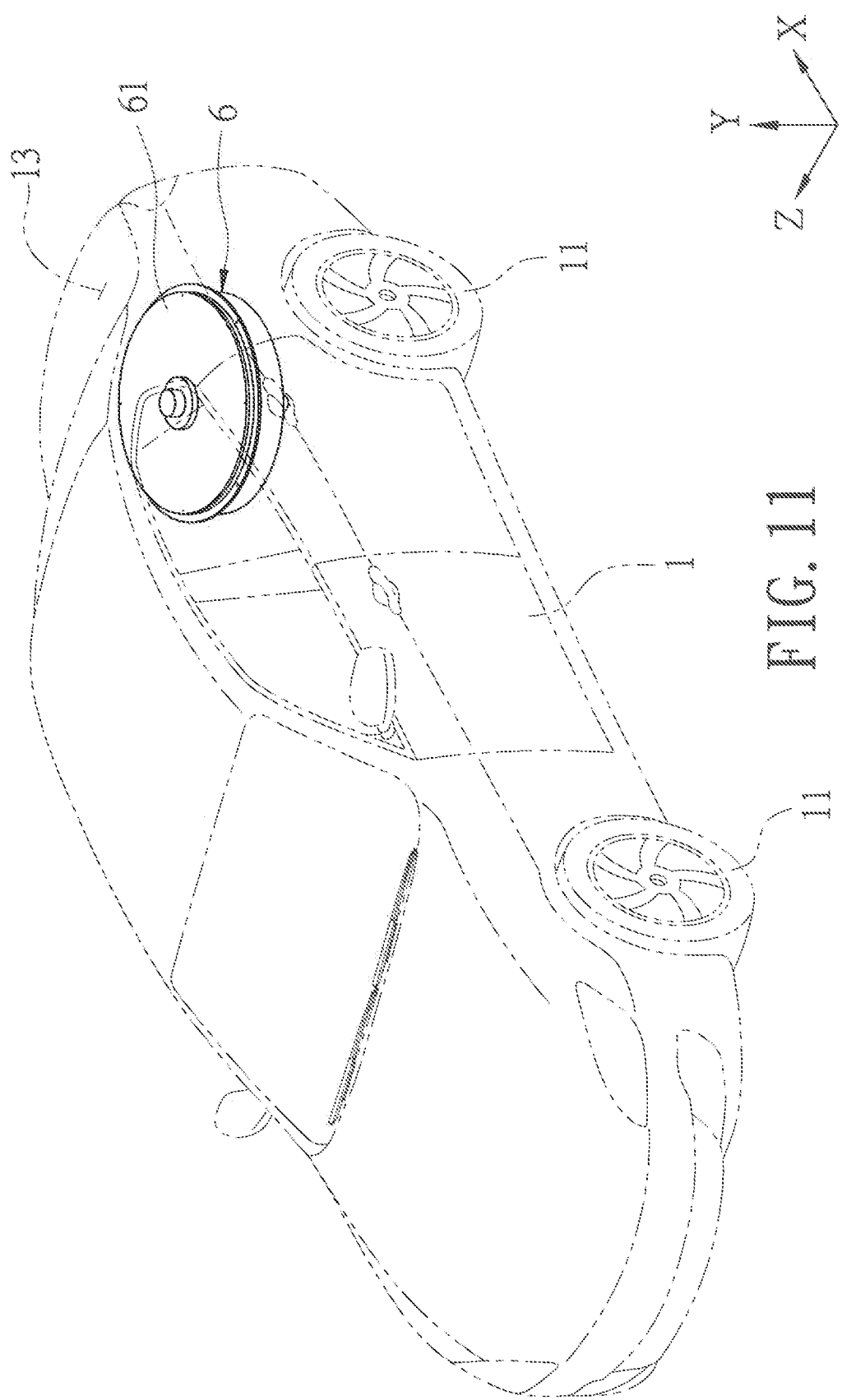
FIG. 11 is a stereogram showing a drive motor installed on a rear side of a mobile vehicle according to the present invention.

The forgoing embodiments and figures are not intended to limit the modes of the mobile vehicle of the invention. In this invention, the drive motor (6) can be installed in the engine room (12) on the front side of the car body (1) as shown in FIG. 1, so that the transmission (7) can be connected to the differential (71) on the two front wheels (11) to be the front wheel drive. Referring to FIG. 11, the drive motor (6) also can be installed in the luggage compartment (13) on the rear side of the car body (1) for connecting the transmission (7). After the drive motor (6) is connected to the transmission (7), the transmission (7) can be connected to the differential (71) on the two rear wheels (11) to be the rear wheel drive.

Figure 12:
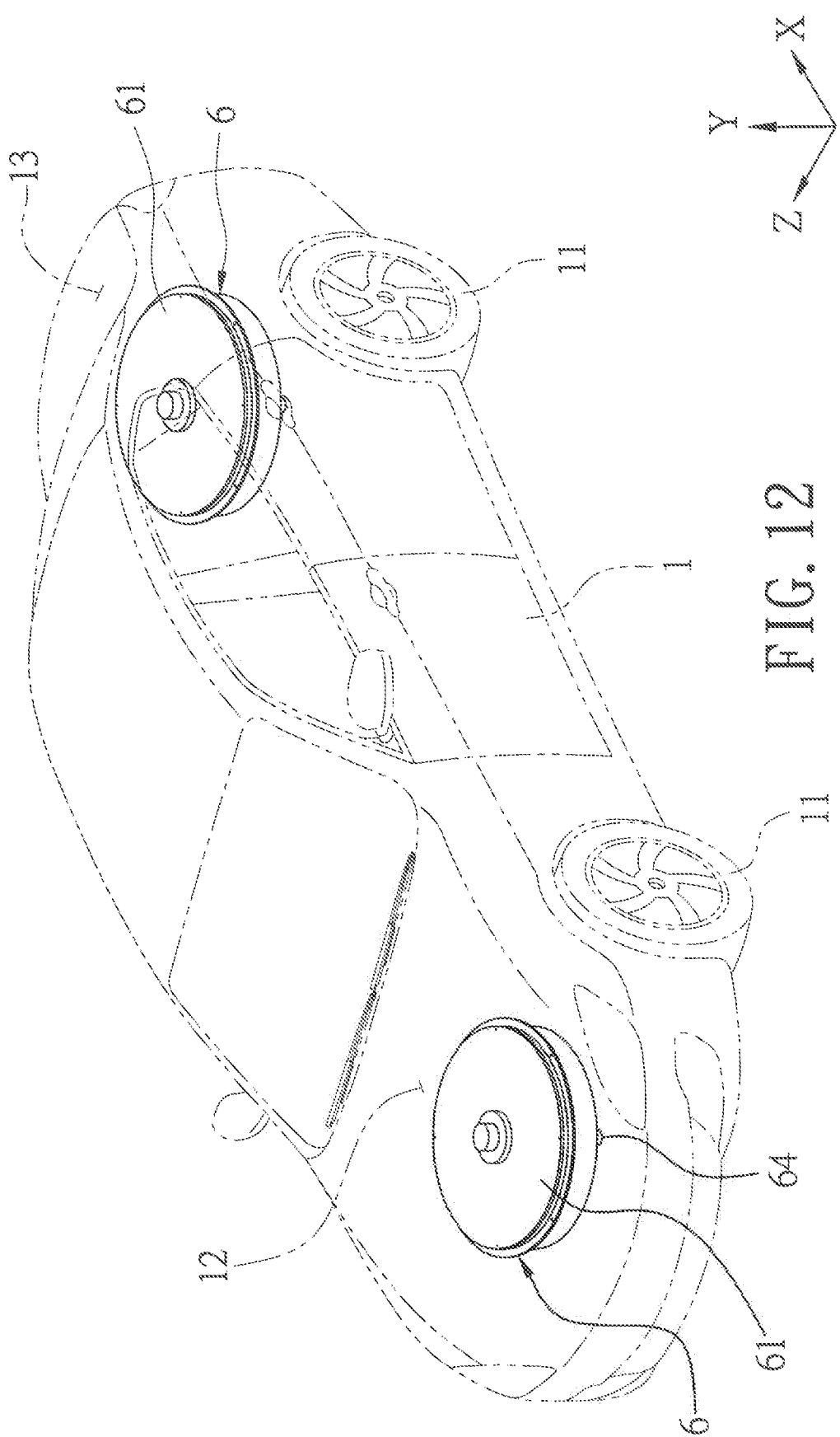
FIG. 12 is a stereogram showing two drive motors installed on a front side and a rear side of a mobile vehicle according to the present invention.

Referring to FIG. 12, two drive motors (6) also can be respectively installed in the engine room (12) on the front side of the car body (1) and in the luggage compartment (13) on the rear side of the car body (1). The capacitive battery (5) is connected to the two drive motors (6) in the engine room (12) and the luggage compartment (13) by two power cables (51), respectively. The power and motor controller (4) is connected to the two drive motors (6) in the engine room (12) and the luggage compartment (13) by two signal cables (41), respectively. Two transmissions (7) are respectively connected to the two drive motors (6) in the engine room (12) and the luggage compartment (13) and respectively connected to the two differentials (71) of the two wheels (11) disposed on the front side and two wheels (11) disposed on the rear side of the car body (1). Accordingly, the drive motors (6) can be provided to the four-wheel drive vehicles, such as off-road vehicles and chariots.

Furthermore, the gasoline engine (2), the electricity generator (3), and the capacitive battery (5) also can be replaced by general batteries. A plurality of batteries are assembled to be a power supply unit connected with a power cable to provide electricity to the drive motor (6). Due to the increase of the volume of the stator ring (621) of the stator unit (62) of the drive motor (6) and increases of the volume and the thickness of the permanent magnetic sheets (636) of the rotor unit (63) to promote the magnetic field effects and the sensing area, the same electric voltage and current can be used to obtain several times of torque and horsepower. When the present invention is used in a pure electric mobile vehicle, the present invention can save at least half electricity, comparing with the existing pure electric mobile vehicle, to effectively improve the endurance of the pure electric mobile vehicle.

According to the above description, in comparison with the traditional technique, the mobile vehicle according to the present invention has the advantages as following:

1. The drive motor is disposed in the spacious engine room or the luggage compartment without being limited to a narrow space of a wheel frame, so the volume of the motor body, the stator unit and the rotor unit of the drive motor and the volume of the stator ring of the stator unit and the permanent magnetic sheets of the rotor unit can also be increased according to the use requirement, so as to achieve the effects of providing large torque and horsepower and improving the endurance of the drive motor.

2. The drive motor is installed in the engine room or the luggage compartment in the car body to be away from the wheels, so the vibration damage of the drive motor can be effectively reduced when the mobile vehicle travels on bumpy roads.

3. The permanent magnetic sheets of the drive motor is disposed at the end surface of the rotor base for corresponding to an end surface of the stator ring, so the sensing area between the stator ring and the permanent magnetic sheets is increased to further promote the output horsepower and torque of the drive motor.

4. The volume of the stator ring and the volume and the thickness of the permanent Magnetic sheets can be increased according to the use requirement to promote the magnetic field effects and the sensing area, so the same electric voltage and current can be used to obtain several times of torque and horsepower, which achieves effective energy savings and improves the endurance of the mobile vehicle.

5. The drive motor in provided with the motor commutation control element for detecting the change of the magnetic field strength of the rotor unit or detecting the rotating speed of the rotational shaft to adjust the voltage of the coils, so the drive motor can be operated more smoothly and efficiently.

What is claimed is:

1. A mobile vehicle, comprising:

a car body having two wheels on two laterals of each of a front side and a rear side thereof, an engine room on the front side thereof, and a luggage compartment on the rear side thereof;

a gasoline engine in the car body;

an electricity generator connected to the gasoline engine in the car body;

a power and motor controller connected to the electricity generator in the car body and having at least one signal cable;

at least one capacitive battery connected to the power and motor controller in the car body and having at least one power cable;

a drive motor disposed in the engine room or the luggage compartment and connected to the at least one capacitive battery by the at least one power cable and to the power and motor controller by the at least one signal cable, wherein the drive motor has a motor body disposed along an X-axis in the engine room or the luggage compartment, a stator unit on one side of the motor body, a rotor unit on the other side of the motor body and a rotational shaft passing through a center of the motor body along a Y-axis for assembling to the rotor unit for fixation, and wherein a volume of the motor body, the stator unit and the rotor unit can be simultaneously amplified toward one or more of the X-axis, the Y-axis, and a Z-axis; and a transmission connected to one end of the rotational shaft protruded from the motor body and having a differential disposed on the front side or the rear side of the car body and connected to the two wheels on the two laterals of each of the front side and the rear side of the car body.

2. The mobile vehicle as claimed in claim 1, wherein the motor body of the drive motor comprises a casing base having a chamber at a first end thereof, a first assembling part at a bottom center of the chamber and having a shaft hole at a center thereof, a first assembling slot corresponding to the first assembling part at a second end thereof and having a stop flange at an opening thereof, at least one bearing accommodated in the first assembling slot, a retaining ring in the first assembling slot for screwing to the stop flange by plural fasteners and sealing the opening, of the first assembling slot to position the at least one bearing in the first assembling slot, a fixing flange formed on an outer wall thereof and having plural lock holes for the plural fasteners to be inserted and fixed to the car body, a cable outlet hole on a lateral wall of the chamber, and a fixing ring at a bottom of the chamber; and a shell cover for correspondingly covering on an opening of the chamber of the casing base and having a second assembling part at a center at a first end thereof, a second assembling slot at a second end thereof and corresponding to the second assembling part, a bearing disposed in the second assembling slot, and a buckle ring disposed at an opening of the second assembling slot to position the bearing in the second assembling slot; wherein the stator unit further comprises a stator ring made of a long steel strip that is wound and tightly fixed into a ring body to be accommodated in the chamber and having a first end and a second end fixed to the fixing ring, a through hole at a center of the stator ring, plural coil holes arranged at intervals on an inner wall of the stator ring, plural ditches at the first end of the stator ring for correspondingly communicating with the plural coil holes, and plural coils for respectively winding between the two adjacent coil holes and connected in series by the two adjacent coils thereof for passing through the cable outlet hole to connect the at least one power cable of the at least one capacitive battery and connect the at least one signal cable of the power and motor controller; the rotor unit further comprising a rotor base accommodated in the chamber of the casing base and having a first end and a second end corresponding to the stator ring, a shaft sleeve at a center of the rotor base, a shaft hole at a center of the shaft sleeve, a first positioning part on a wall of the shaft hole, plural fixing slots around the shaft sleeve at the second end of the rotor base, and plural permanent magnetic sheets respectively and correspondingly connected to the plural fixing slots for further corresponding to the plural coils on the stator ring; and wherein the rotational shaft is inserted into the shaft hole on the rotor base and further provided with a first end protruded from the first end of the rotor base and passing through the buckle ring in the second assembling slot for connecting the bearing in the second assembling slot and locking the shell cover to the casing base by the plural fasteners, a second end passing through the second end of the rotor base, the through hole on the stator ring, the shaft hole of the first assembling part, the at least one bearing and the retaining ring and protruded from the second end of the casing base, a second positioning part corresponding to the first positioning part, a fixing element for connecting the second positioning part to the first positioning part and fixing the rotational shaft to the rotor base, and a positioning ring contacting the at least one bearing in the first assembling slot through the shaft hole of the first assembling part of the casing base for positioning.

3. The mobile vehicle as claimed in claim 1, wherein the motor body of the drive motor comprises a casing base having a chamber at a first end thereof, a first assembling part at a center at a second end thereof and having a shaft hole at a center thereof, a first assembling slot at a bottom of the chamber and corresponding to the first assembling part, at least one bearing accommodated in the first assembling slot, a buckle ring disposed at an opening of the first assembling slot to position the at least one bearing in the first assembling slot, a fixing flange formed on an outer wall thereof and having plural lock holes for plural fasteners to be inserted and fixed to the car body, and a cable outlet hole on a lateral wall of the chamber; and a shell cover for correspondingly covering on an opening of the chamber of the casing base and having a second assembling part at a center at a first end thereof, a second assembling slot at a second end thereof and corresponding to the second assembling part, a bearing disposed in the second assembling slot, and a buckle ring disposed at an opening of the second assembling slot to position the bearing in the second assembling slot; wherein the stator unit further comprises a stator base accommodated in the chamber for the plural fasteners to be inserted and fixed to the casing base and having a first end and a second end connected at a bottom of the chamber, a through hole at a center of the stator base, plural stator blocks and each of which is formed by stacking plural silicon steel sheets having corresponding shapes and tightly integrated into one, plural fixed stands arranged at intervals around the through hole and at the first end of the stator base for correspondingly connecting the plural stator blocks, and plural coils for respectively winding the plural stator blocks and connected in series by the two adjacent coils thereof for passing through the cable outlet hole to connect the at least one power cable of the at least one capacitive battery and connect the at least one signal cable of the power and motor controller; the rotor unit further comprising a rotor base accommodated in the chamber of the casing base and having a first end and a second end facing the stator unit, a via hole at a center of the rotor base, a shaft sleeve at a center of the via hole, plural ribs arranged at intervals in the via hole for connecting the shaft sleeve, a shaft hole at a center of the shaft sleeve, a first positioning part on a wall of the shaft hole, plural fixed bases around the shaft sleeve at the second end of the rotor base, and plural permanent magnetic sheets respectively connected to the plural fixed bases for further corresponding to the plural stator blocks on the stator base; and wherein the rotational shaft is inserted into the shaft hole on the rotor base and further provided with a first end protruded from the first end of the rotor base and passing through the buckle ring in the second assembling slot for connecting the bearing in the second assembling slot and locking the shell cover on the casing base by the plural fasteners, a second end passing through the second end of the rotor base, the through hole on the stator base, the shaft hole of the first assembling part, the at least one bearing and the buckle ring and protruded from the second end of the casing base, a second positioning part corresponding to the first positioning part, a fixing element for connecting the second positioning part to the first positioning part and fixing the rotational shaft to the rotor base.

4. The mobile vehicle as claimed in claim 1, wherein the drive motor is further provided with at least one motor commutation control element for connecting the power and motor controller by the at least one signal cable, and wherein the at least one motor commutation control element is a Hall element, a magnetic commutation encoder or an optical commutation encoder.

5. The mobile vehicle as claimed in claim 1, wherein the car body is further provided with an accelerating gearbox for connecting one end of the motor body protruding from the rotational shaft and connecting the transmission.

6. A mobile vehicle, comprising:
  a car body having two wheels on two laterals of each of a front side and a rear side thereof, an engine room on the front side thereof, and a luggage compartment on the rear side thereof;
  a gasoline engine in the car body;
  an electricity generator connected to the gasoline engine in the car body;
  a power and motor controller connected to the electricity generator in the car body and having at least one signal cable;
  at least one capacitive battery connected to the power and motor controller in the car body and having at least one power cable;
  two drive motors respectively disposed in the engine room and the luggage compartment and each of which connected to the at least one capacitive battery by the at least one power cable and to the power and motor controller by the at least one signal cable, wherein each of the two drive motors has a motor body disposed along an X-axis in each of the engine room and the luggage compartment, a stator unit accommodated in the motor body, a rotor unit corresponding to the stator unit and a rotational shaft passing through a center of the motor body along a Y-axis for assembling to the rotor unit for fixation, and wherein a volume of the motor body, the stator unit and the rotor unit of each of the two drive motors can be simultaneously amplified toward one or more of the X-axis, the Y-axis, and a Z-axis; and
  two transmissions, each of which connected to one end of the rotational shaft protruded from the motor body of each of the two drive motors and having a differential disposed on each of the front side and the rear side of the car body for connection and connected to the two wheels on the two laterals of each of the front side and the rear side of the car body.

7. The mobile vehicle as claimed in claim 6, wherein the motor body of each of the two drive motors comprises a casing base having a chamber at a first end thereof, a first assembling part at a bottom center of the chamber and having a shaft hole at a center thereof, a first assembling slot corresponding to the first assembling part at a second end thereof and having a stop flange at an opening thereof, at least one bearing accommodated in the first assembling slot, a retaining ring in the first assembling slot for screwing to the stop flange by plural fasteners and sealing the opening of the first assembling slot to position the at least one bearing in the first assembling slot, a fixing flange formed on an outer wall thereof and having plural lock holes for the plural fasteners to be inserted and fixed to the car body, a cable outlet hole on a lateral wall of the chamber, and a fixing ring at a bottom of the chamber; and a shell cover for correspondingly covering on an opening of the chamber of the casing base and having a second assembling part at a center at a first end thereof, a second assembling slot at a second end thereof and corresponding to the second assembling part, a bearing disposed in the second assembling slot, and a buckle ring disposed at an opening of the second assembling slot to position the bearing in the second assembling slot; wherein the stator unit further comprises a stator ring made of a long steel strip that is wound and tightly fixed into a ring body to be accommodated in the chamber and having a first end and a second end fixed to the fixing ring, a through hole at a center of the stator ring, plural coil holes arranged at intervals on an inner wall of the stator ring, plural ditches at the first end of the stator ring for correspondingly communicating with the plural coil holes, and plural coils for respectively winding between the two adjacent coil holes and connected in series by the two adjacent coils thereof for passing through the cable outlet hole to connect the at least one power cable of the at least one capacitive battery and connect the at least one signal cable of the power and motor controller; the rotor unit further comprising a rotor base accommodated in the chamber of the casing base and having a first end and a second end corresponding to the stator ring, a shaft sleeve at a center of the rotor base, a shaft hole at a center of the shaft sleeve, a first positioning part on a wall, of the shaft hole, plural fixing slots around the shaft sleeve at the second end of the rotor base, and plural permanent magnetic sheets respectively and correspondingly connected to the plural fixing slots for further corresponding to the plural coils on the stator ring; and wherein the rotational shaft is inserted into the shaft hole on the rotor base and further provided with a first end protruded from the first end of the rotor base and passing through the buckle ring in the second assembling slot for connecting the bearing in the second assembling slot and locking the shell cover to the casing base by the plural fasteners, a second end passing through the second end of the rotor base, the through hole on the stator ring, the shaft hole of the first assembling part, the at least one bearing and the retaining ring and protruded from the second end of the casing base, a second positioning part corresponding to the first positioning part, a fixing element for connecting the second positioning part to the first positioning part and fixing the rotational shaft the rotor base, and a positioning ring contacting the at least one bearing in the first assembling slot through the shaft hole of the first assembling part of the casing base for positioning.

8. The mobile vehicle as claimed in claim 6, wherein the motor body of each of the two drive motors comprises a casing base having a chamber at a first end thereof, a first assembling part at a center at a second end thereof and having a shaft hole at a center thereof, a first assembling slot at a bottom of the chamber and corresponding to the first assembling part, at least one bearing accommodated in the first assembling slot, a buckle ring disposed at an opening of the first assembling slot to position the at least one bearing in the first assembling slot, a fixing flange formed on an outer wall thereof and having plural lock holes for plural fasteners to be inserted and fixed to the car body, and a cable outlet hole on a lateral wall of the chamber; and a shell cover for correspondingly covering on an opening of the chamber of the casing base and having a second assembling part at a center at a first end thereof, a second assembling slot at a second end thereof and corresponding to the second assembling part, a bearing disposed in the second assembling slot, and a buckle ring disposed at an opening of the second assembling slot to position the bearing in the second assembling slot; wherein the stator unit further comprises a stator base accommodated in the chamber for the plural fasteners to be inserted and fixed to the casing base and having a first end and a second end connected at a bottom of the chamber, a through hole at a center of the stator base, plural stator blocks and each of which is formed by stacking plural silicon steel sheets having corresponding shapes and tightly integrated into one, plural fixed stands arranged at intervals around the through hole and at the first end of the stator base for correspondingly connecting the plural stator blocks, and plural coils for respectively winding the plural stator blocks and connected in series by the two adjacent coils thereof for passing through the cable outlet hole to connect the at least one power cable of the at least one capacitive battery and connect the at least one signal cable of the power and motor controller; the rotor unit further comprising a rotor base accommodated in the chamber of the casing base and having a first end and a second end facing the stator unit, a via hole at a center of the rotor base, a shaft sleeve at a center of the via hole, plural ribs arranged at intervals in the via hole for connecting the shaft sleeve, a shaft hole at a center of the shaft sleeve, a first positioning part on a wall of the shaft hole, plural fixed bases around the shaft sleeve at the second end of the rotor base, and plural permanent magnetic sheets respectively connected to the plural fixed bases for further corresponding to the plural stator blocks on the stator base; and wherein the rotational shaft is inserted into the shaft hole on the rotor base and further provided with a first end protruded from the first end of the rotor base and passing through the buckle ring in the second assembling slot for connecting the bearing in the second assembling slot and locking the shell cover on the casing base by the plural fasteners, a second end passing through the second end of the rotor base, the through hole on the stator base, the shaft hole of the first assembling part, the at least one bearing and the buckle ring and protruded from the second end of the casing base, a second positioning part corresponding to the first positioning part, a fixing element or connecting the second positioning part to the first positioning part and fixing the rotational shaft to the rotor base.

9. The mobile vehicle as claimed in claim 6, wherein the drive motor is further provided with at least one motor commutation control element for connecting the power and motor controller by the at least one signal cable, and wherein the at least one motor commutation control element is a Hall element, a magnetic commutation encoder or an optical commutation encoder.

10. The mobile vehicle as claimed in claim 6, wherein the car body is further provided with an accelerating gearbox for connecting one end of the motor body protruding from the rotational shaft and connecting the transmission.

11. A mobile vehicle, comprising:
  a car body having two wheels on two laterals of each of a front side and a rear side thereof; an engine room on the front side thereof; a luggage compartment on the rear side thereof and a power supply;
  a power and motor controller connected to the power supply of the car body and having at least one signal cable;
  at least one capacitive battery connected to the power and motor controller in the car body and having at least one power cable;

a drive motor disposed in the engine room or the luggage compartment and connected to the at least one capacitive battery by the at least one power cable and to the power and motor controller by the at least one signal cable, wherein the drive motor has a motor body disposed along an X-axis in the engine room or the luggage compartment, a stator unit on one side of the motor body, a rotor unit on the other side of the motor body and a rotational shaft passing through a center of the motor body along a Y-axis for assembling to the rotor unit for fixation, and wherein a volume of the motor body, the stator unit and the rotor unit can be simultaneously amplified toward one or more of the X-axis, the Y-axis, and a Z-axis; and a transmission connected to one end of the rotational shaft protruded from the motor body and having a differential disposed on the front side or the rear side of the car body and connected to the two wheels on the two laterals of each of the front side and the rear side of the car body.

12. The mobile vehicle as claimed in claim 11, wherein the motor body of the drive motor comprises a casing base aving a chamber at a first end thereof, a first assembling part at a bottom center of the chamber and having a shaft hole at a center thereof, a first assembling slot corresponding to the first assembling part at a second end thereof and having a stop flange at an opening thereof, at least one bearing accommodated in the first assembling slot, a retaining ring in the first assembling slot for screwing to the stop flange by plural fasteners and sealing the opening of the first assembling slot to position the at least one bearing in the first assembling slot, a fixing flange formed on an outer wall thereof and having plural lock holes for the plural fasteners to be inserted and fixed to the car body, a cable outlet hole on a lateral wall of the chamber, and a fixing ring at a bottom of the chamber; and a shell cover for correspondingly covering on an opening of the chamber of the casing base and having a second assembling part at a center at a first end thereof, a second assembling slot at a second end thereof and corresponding to the second assembling part, a bearing disposed in the second assembling slot, and a buckle ring disposed at an opening of the second assembling slot to position the bearing in the second assembling slot; wherein the stator unit further comprises a stator ring made of a long steel strip that is wound and tightly fixed into a ring body to be accommodated in the chamber and having a first end and a second end fixed to the fixing ring, a through hole at a center of the stator ring, plural coil holes arranged at intervals on an inner wall of the stator ring, plural ditches at the first end of the stator ring for correspondingly communicating with the plural coil holes, and plural coils for respectively winding between the two adjacent coil holes and connected in series by the two adjacent coils thereof for passing through the cable outlet hole to connect the power supply by the at least one power cable and connect the at least one signal cable of the power and motor controller; the rotor unit further comprising a rotor base accommodated in the chamber of the casing base and having a first end and a second end corresponding to the stator ring, a shaft sleeve at a center of the rotor base, a shaft hole at a center of the shaft sleeve, a first positioning part on a wall of the shaft hole, plural fixing slots around the shaft sleeve at the second end of the rotor base, and plural permanent magnetic sheets respectively and correspondingly connected to the plural fixing slots for further corresponding to the plural coils on the stator ring; and wherein the rotational shaft is inserted into the shaft hole on the rotor base and further provided with a first end protruded from the first end of the rotor base and passing through the buckle ring in the second assembling slot for connecting the bearing in the second assembling slot and locking the shell cover to the casing base by the plural fasteners, a second end passing through the second end of the rotor base, the through hole on the stator ring, the shaft hole of the first assembling part, the at least one bearing and the retaining ring and protruded from the second end of the casing base, a second positioning part corresponding to the first positioning part, a fixing element for connecting the second positioning part to the first positioning part and fixing the rotational shaft to the rotor base, and a positioning ring contacting the at least one bearing in the first assembling slot through the shaft hole of the first assembling part of the casing base for positioning.

13. The mobile vehicle as claimed in claim 11, wherein the wherein the motor body of the drive motor comprises a casing base having a chamber at a first end thereof, a first assembling part at a center at a second end thereof and having a shaft hole at a center thereof; a first assembling slot at a bottom of the chamber and corresponding to the first assembling part, at least one bearing accommodated in the first assembling slot, a buckle ring disposed at an opening of the first assembling slot to position the at least one bearing in the first assembling slot, a fixing flange formed on an outer wall thereof and having plural lock holes for plural fasteners to be inserted and fixed to the car body, and a cable outlet hole on a lateral wall of the chamber; and a shell cover for correspondingly covering on an opening of the chamber of the casing base and having a second assembling part at a center at a first end thereof, a second assembling slot at a second end thereof and corresponding to the second assembling part, a bearing disposed in the second assembling slot, and a buckle ring disposed at an opening of the second assembling slot to position the bearing in the second assembling slot; wherein the stator unit further comprises a stator base accommodated in the chamber for the plural fasteners to be inserted and fixed to the casing base and having a first end and a second end connected at a bottom of the chamber, a through hole at a center of the stator base, plural stator blocks and each of which is formed by stacking plural silicon steel sheets having corresponding shapes and tightly integrated into one, plural fixed stands arranged at intervals around the through hole and at the first end of the stator base for correspondingly connecting the plural stator blocks, and plural coils for respectively winding the plural stator blocks and connected in series by the two adjacent coils thereof for passing through the cable outlet hole to connect the power supply by the at least one power cable and connect the at least one signal cable of the power and motor controller; the rotor unit further comprising a rotor base accommodated in the chamber of the casing base and having a first end and a second end facing the stator unit, a via hole at a center of the rotor base, a shaft sleeve at a center of the via hole, plural ribs arranged at intervals in the via hole for connecting the shaft sleeve, a shaft hole at a center of the shaft sleeve, a first positioning part on a wall of the shaft hole, plural fixed bases around the shaft sleeve at the second end of the rotor base, and plural permanent magnetic sheets respectively connected to the plural fixed bases for further corresponding to the plural stator blocks on the stator base; and wherein the rotational shaft is inserted into the shaft hole on the rotor base and further provided with a first end protruded from the first end of the rotor base and passing through the buckle ring in the second assembling slot for connecting the bearing in the second assembling slot and locking the shell cover on the casing base by the plural fasteners, a second end passing through the second end of the rotor base, the through hole on the stator base, the shaft hole of the first assembling part, the at least one bearing and the buckle ring and protruded from the second end of the casing base, a second positioning part corresponding to the first positioning part, a fixing element for connecting the second positioning part to the first positioning part and fixing the rotational shaft to the rotor base.

14. The mobile vehicle as claimed in claim 11, wherein the drive motor is further provided with at least one motor commutation control element for connecting the power and motor controller by the at least one signal cable, and wherein the at least one motor commutation control element is a Hall element, a magnetic commutation encoder or an optical commutation encoder.

15. The mobile vehicle as claimed in claim 11, wherein the car body is further provided with an accelerating gearbox for connecting one end of the motor body protruding from the rotational shaft and connecting the transmission.

16. A mobile vehicle, comprising:
a car body having two wheels on two laterals of each of a front side and a rear side thereof, an engine room on the front side thereof, a luggage compartment on the rear side thereof and a power supply;
a power and motor controller connected to the power supply of the car body and having at least one signal cable;
at least one capacitive battery connected to the power and motor controller in the car body and having at least one power cable;
two drive motors respectively disposed in the engine room and the luggage compartment and each of which connected to the at least one capacitive battery by the at least one power cable and to the power and motor controller by the at least one signal cable, wherein each of the two drive motors has a motor body disposed along an X-axis in each of the engine room and the luggage compartment, a stator unit accommodated in the motor body, a rotor unit corresponding to the stator unit and a rotational shaft passing through a center of the motor body along a Y-axis for assembling to the rotor unit for fixation, and wherein a volume of the motor body, the stator unit and the rotor unit of each of the two drive motors can be simultaneously amplified toward one or more of the X-axis, the Y-axis, and a Z-axis; and
two transmissions, each of which connected to one end of the rotational shaft protruded from the motor body of each of the two drive motors and having a differential disposed on each of the front side and the rear side of the car body for connection and connected to the two wheels on the two laterals of each of the front side and the rear side of the car body.

17. The mobile vehicle as claimed in claim 16, wherein the motor body of each of the two drive motors comprises a casing base having a chamber at a first end thereof, a first assembling part at a bottom center of the chamber and having a shaft hole at a center thereof, a first assembling slot corresponding to the first assembling part at a second end thereof and having a stop flange at an opening thereof, at least one bearing accommodated in the first assembling slot, a retaining ring in the first assembling slot for screwing to the stop flange by plural fasteners and sealing the opening of the first assembling slot to position the at least one bearing in the first assembling slot, a fixing flange formed on an outer wall thereof and having plural lock holes for the plural fasteners to be inserted and fixed to the car body, a cable outlet hole on a lateral wall of the chamber, and a fixing ring at a bottom of the chamber; and a shell cover for correspondingly covering on an opening of the chamber of the casing base and having a second assembling part at a center at a first end thereof, a second assembling slot at a second end thereof and corresponding to the second assembling part, a bearing disposed in the second assembling slot, and a buckle ring disposed at an opening of the second assembling slot to position the bearing in the second assembling slot; wherein the stator unit further comprises a stator ring made of a long steel strip that is wound and tightly fixed into a ring body to be accommodated in the chamber and having a first end and a second end fixed to the fixing ring, a through hole at a center of the stator ring, plural coil holes arranged at intervals on an inner wall of the stator ring, plural ditches at the first end of the stator ring for correspondingly communicating with the plural coil holes, and plural coils for respectively winding between the two adjacent coil holes and connected in series by the two adjacent coils thereof for passing through the cable outlet hole to connect the power supply by the at least one power cable and connect the at least one signal cable of the power and motor controller; the rotor unit further comprising a rotor base accommodated in the chamber of the casing base and having a first end and a second end corresponding to the stator ring, a shaft sleeve at a center of the rotor base, a shaft hole at a center of the shaft sleeve, a first positioning part on a wall of the shaft hole, plural fixing slots around the shaft sleeve at the second end of the rotor base, and plural permanent magnetic sheets respectively and correspondingly connected to the plural fixing slots for further corresponding to the plural coils on the stator ring; and wherein the rotational shaft is inserted into the shaft hole on the rotor base and further provided with a first end protruded from the first end of the rotor base and passing through the buckle ring in the second assembling slot for connecting the bearing in the second assembling slot and locking the shell cover to the casing base by the plural fasteners, a second end passing through the second end of the rotor base, the through hole on the stator ring, the shaft hole of the first assembling part, the at least one bearing and the retaining ring and protruded from the second end of the casing base, a second positioning part corresponding to the first positioning part, a fixing element for connecting the second positioning part to the first positioning part and fixing the rotational shaft to the rotor base, and a positioning ring contacting the at least one bearing in the first assembling slot through the shaft hole of the first assembling part of the casing base for positioning.

18. The mobile vehicle as claimed in claim 16, wherein the motor body of each of the two drive motors comprises a casing base having a chamber at a first end thereof, a first assembling part at a center at a second end thereof and having a shaft hole at a center thereof, a first assembling slot at a bottom of the chamber and corresponding to the first assembling part, at least one bearing accommodated in the first assembling slot, a buckle ring disposed at an opening of the first assembling slot to position the at least one bearing in the first assembling slot, a fixing flange formed on an outer wall thereof and having plural lock holes for plural fasteners to be inserted and fixed to the car body, and a cable outlet hole on a lateral wall of the chamber; and a shell cover for correspondingly covering on an opening of the chamber of the casing base and having a second assembling part at a center at a first end thereof, a second assembling slot at a second end thereof and corresponding to the second assembling part, a bearing disposed in the second assembling slot, and a buckle ring disposed at an opening of the second assembling slot to position the bearing in the second assembling slot; wherein the stator unit further comprises a stator base accommodated in the chamber for the plural fasteners to be inserted and fixed to the casing base and having a first end and a second end connected at a bottom of the chamber, a through hole at a center of the stator base, plural stator blocks and each of which is formed by stacking plural silicon steel sheets having corresponding shapes and tightly integrated into one, plural fixed stands arranged at intervals around the through hole and at the first end of the stator base for correspondingly connecting the plural stator blocks, and plural coils for respectively winding the plural stator blocks and connected in series by the two adjacent coils thereof for passing through the cable outlet hole to connect the power supply by the at least one power cable and connect the at least one signal cable of the power and motor controller; the rotor unit further comprising a rotor base accommodated in the chamber of the casing base and having a first end and a second end facing the stator unit, a via hole at a center of the rotor base, a shaft sleeve at a center of the via hole, plural ribs arranged at intervals in the via hole for connecting the shaft sleeve, a shaft hole at a center of the shaft sleeve, a first positioning part on a wall of the shaft hole, plural fixed bases around the shaft sleeve at the second end of the rotor base, and plural permanent magnetic sheets respectively connected to the plural fixed bases for further corresponding to the plural stator blocks on the stator base; and wherein the rotational shaft is inserted into the shaft hole on the rotor base and further provided with a first end protruded from the first end of the rotor base and passing through the buckle ring in the second assembling slot for connecting the bearing in the second assembling slot and locking the shell cover on the casing base by the plural fasteners, a second end passing through the second end of the rotor base, the through hole on the stator base, the shaft hole of the first assembling part, the at least one bearing and the buckle ring and protruded from the second end of the casing base, a second positioning part corresponding to the first positioning part, a fixing element for connecting the second positioning part to the first positioning part and fixing the rotational shaft to the rotor base.

19. The mobile vehicle as claimed in claim 16, wherein the drive motor is further provided with at least one motor commutation control element for connecting the power and motor controller by the at least one signal cable, and wherein the at least one motor commutation control element is a Hall element, a magnetic commutation encoder or an optical commutation encoder.

20. The mobile vehicle as claimed in claim 16, wherein the car body is further provided with an accelerating gearbox for connecting one end of the motor body protruding from the rotational shaft and connecting the transmission.

* * * * *